United States Patent
Sun et al.

(10) Patent No.: US 12,531,616 B2
(45) Date of Patent: Jan. 20, 2026

(54) FULL POWER TRANSMISSION MODE 2 TPMI LIST SIGNALING ENHANCEMENT

(71) Applicant: APPLE INC., Cupertino, CA (US)

(72) Inventors: Haitong Sun, Cupertino, CA (US); Yushu Zhang, Beijing (CN); Chunhai Yao, Beijing (CN); Chunxuan Ye, San Diego, CA (US); Dawei Zhang, Cupertino, CA (US); Hong He, Cupertino, CA (US); Jie Cui, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 442 days.

(21) Appl. No.: 17/593,712

(22) PCT Filed: Apr. 13, 2021

(86) PCT No.: PCT/CN2021/086814
§ 371 (c)(1),
(2) Date: Sep. 23, 2021

(87) PCT Pub. No.: WO2022/027997
PCT Pub. Date: Feb. 10, 2022

(65) Prior Publication Data
US 2022/0360311 A1      Nov. 10, 2022

(30) Foreign Application Priority Data
Aug. 6, 2020  (WO) ................ PCT/CN2020/107511

(51) Int. Cl.
*H04B 7/06*       (2006.01)
*H04B 7/0456*   (2017.01)

(52) U.S. Cl.
CPC ......... *H04B 7/0639* (2013.01); *H04B 7/0456* (2013.01); *H04B 7/0623* (2013.01)

(58) Field of Classification Search
CPC .. H04B 7/0639; H04B 7/0456; H04B 7/0404; H04B 7/0623; H04B 7/0628;
(Continued)

(56) References Cited

U.S. PATENT DOCUMENTS

| | | | |
|---|---|---|---|
| 2020/0083939 A1 | 3/2020 | Park et al. | |
| 2020/0267661 A1* | 8/2020 | Park | H04W 76/27 |
| 2022/0094404 A1 | 3/2022 | Yao et al. | |
| 2022/0166475 A1 | 5/2022 | Park et al. | |

(Continued)

FOREIGN PATENT DOCUMENTS

| CN | 110100394 A | 8/2019 |
|---|---|---|
| CN | 110463066 A | 11/2019 |

(Continued)

OTHER PUBLICATIONS

3GPP TSG RAN WG1 #100bis, "Feature lead summary on ULFTPx-03", e-Meeting, Apr. 2020, 7 pages. (Year: 2020).*

(Continued)

*Primary Examiner* — Quoc Thai N Vu
(74) *Attorney, Agent, or Firm* — Dorsey & Whitney LLP

(57) ABSTRACT

Disclosed are enhancements for a Mode 2 TPMI list indication, including TPMI capability reporting design, TPMI list enhancement for four-port partial coherent UE, and TPMI list enhancement for four-port non-coherent UE.

19 Claims, 6 Drawing Sheets

(58) Field of Classification Search
CPC ..... H04B 7/063; H04L 5/0023; H04L 5/0048; H04L 5/0053; H04L 5/0094; H04W 8/24; H04W 72/232
See application file for complete search history.

(56) References Cited

U.S. PATENT DOCUMENTS

| | | | | |
|---|---|---|---|---|
| 2022/0352934 | A1* | 11/2022 | Shi | H04B 7/0639 |
| 2022/0376763 | A1* | 11/2022 | Zhang | H04B 7/0456 |

FOREIGN PATENT DOCUMENTS

| | | |
|---|---|---|
| CN | 110535499 A | 12/2019 |
| CN | 110771086 A | 2/2020 |
| WO | 2019095181 A1 | 5/2019 |

OTHER PUBLICATIONS

PCT/CN2021/086814, International Search Report and Written Opinion, Jul. 9, 2021, 9 pages.

CATT, "On UL full power transmission", R1-2003629, 3GPP TSG RAN WG1 Meeting #101, e-Meeting, Agenda Item 7.2.6.4, May 25-Jun. 5, 2020, 10 pages.

Moderator (AT&T), "Summary of email discussion/approval [101-e-Post-NR-UE-Features-07]", R1-2005113, 3GPP TSG RAN WG1 #101, e-Meeting, Agenda Item 7.2.11.6, May 25-Jun. 5, 2020, 48 pages.

* cited by examiner

FIG. 4A
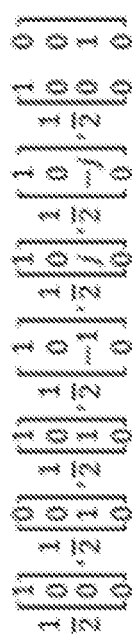
FIG. 4B
FIG. 4C

FULL POWER TRANSMISSION MODE 2 TPMI LIST SIGNALING ENHANCEMENT

TECHNICAL FIELD

This application relates generally to wireless communication systems, including selection of precoding matrices or codebooks.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3A illustrates a table in accordance with one embodiment.

FIG. 3B illustrates a table in accordance with one embodiment.

FIG. 4A illustrates an annotated version of the table of FIG. 3A in accordance with one embodiment.

FIG. 4B illustrates a group of precoding matrices in accordance with one embodiment.

FIG. 4C illustrates a group of precoding matrices in accordance with one embodiment.

DETAILED DESCRIPTION

Figure 1:
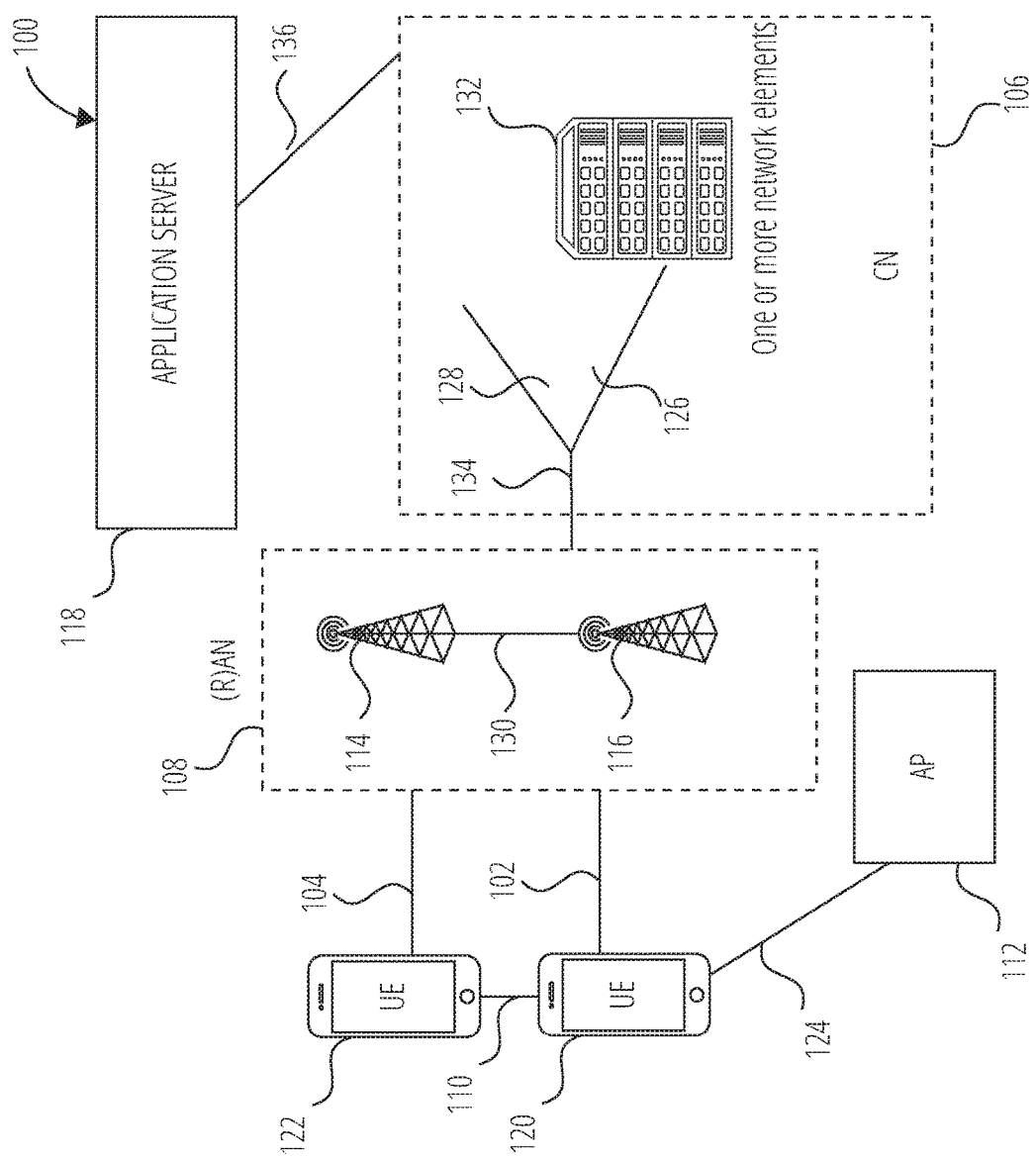
FIG. 1 illustrates a system in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 122 and/or the UE 120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108). In embodiments, the (R)AN 108 may be an NG RAN or a 5G RAN, an E-UTRAN, or a legacy RAN, such as a UTRAN or GERAN. As used herein, the term "NG RAN" or the like may refer to a (R)AN 108 that operates in an NR or 5G system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 122 and UE 120 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WLAN node," "WLAN," "WLAN Termination," "WT" or the like) via connection 124. The connection 124 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124. IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116); a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) or by a server pool in a similar manner as the CRAN/vBBUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an 5GC via an NG interface (discussed infra). In V2X scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the UE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, eLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 122 and UE 120, RAN node 114 or RAN node 116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the Downlink Control Information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC), the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a McNB to an SeNB; information about successful in sequence delivery of PDCP PDUs to a UE 122 from an ScNB for user data; information of PDCP PDUs that were not delivered to a UE 122; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 106 is an SGC), the interface 130 may be an Xn interface. The Xn interface is defined between two or more RAN nodes (e.g., two or more gNBs and the like) that connect to SGC, between a RAN node 114 (e.g., a gNB) connecting to SGC and an eNB, and/or between two eNBs connecting to 5GC (e.g., CN 106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode (e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116; and control of user plane tunnels between old (source) serving RAN node 114 to new (target) serving RAN node 116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 108 is shown to be communicatively coupled to a core network-in this embodiment, CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UMTS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and AMFs.

In embodiments, the CN 106 may be a SG CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMEs.

Figure 2:
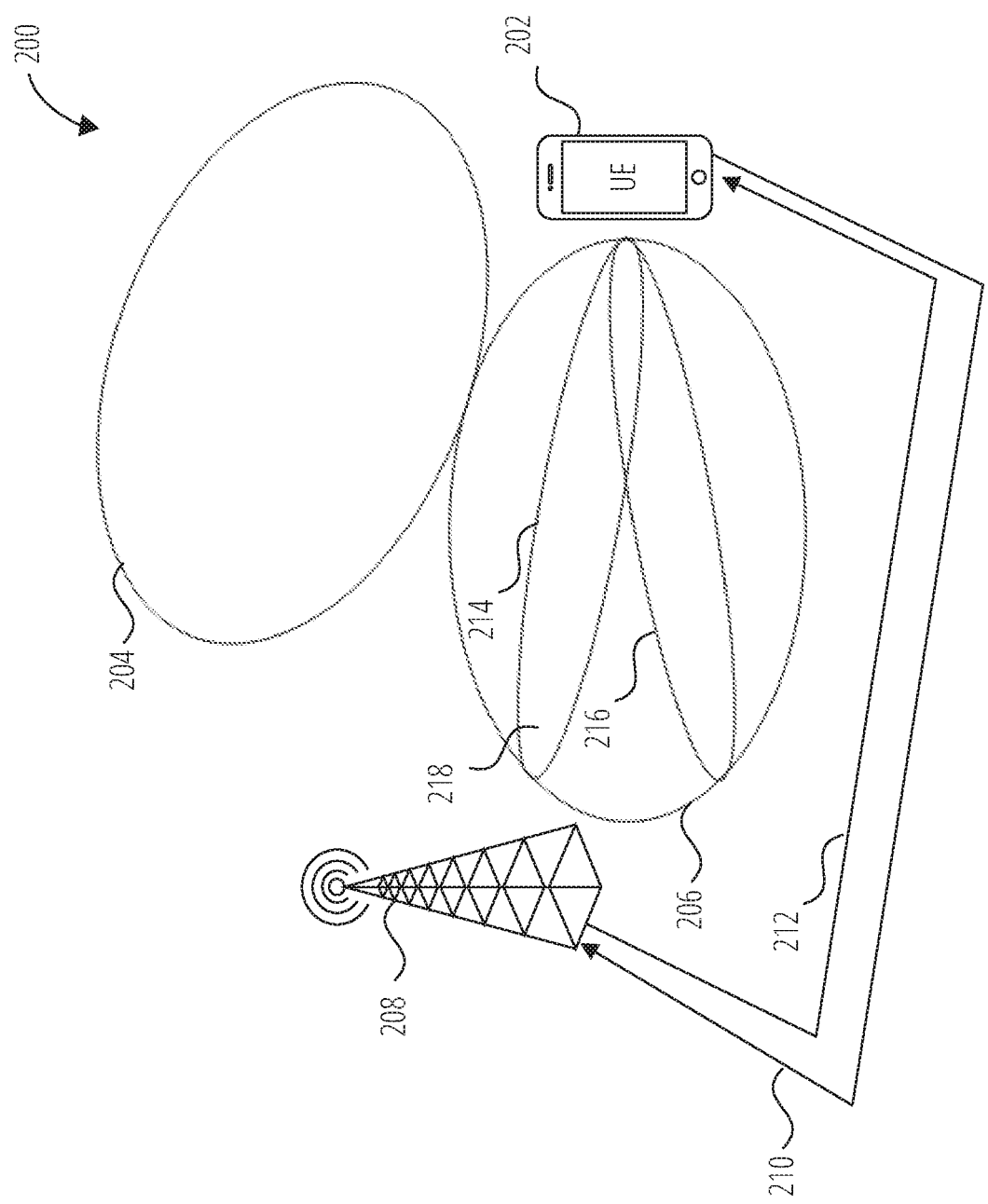
FIG. 2 illustrates a system in accordance with one embodiment.

FIG. 2 shows an example system 200 for codebook-based PUSCH transmission, which is one type of UL transmission scheme indicated by an RRC parameter, txConfig (see e.g., 3GPP TS 38.331; 38.211; and 38.214). For example, a UE 202 is configured to transmit employing one or both a first Sounding Reference Signal (SRS) SRS resource 204 and a second SRS resource 206. In some embodiments, an SRS resource has 1, 2, or 4 antenna ports, in which each antenna port represents the physical resource location of a reference signal that is transmitted. The UE 202 also transmits using precoding matrix associated with a Transmitted Precoding Matrix Indicator (TPMI), which in this example includes TPMI 214 and TPMI 216. Accordingly, at the time when the UE 202 attempts to set up RRC connection with the network, the UE 202 provides to a gNB 208 a TPMI capability report 210, which is explained later. The gNB 208 indicates through DCI 212 an SRS resource indicator (SRI) and TPMI and transmit rank indicator (TRI) (i.e., UE precoder matrix from a precoder codebook and rank), as explained in 3GPP TS 38.214. Thus, the UE 202 performs PUSCH transmission 218 consistent with these UL parameters.

The current status of the NR standard in terms of UL maximum transmit power is as follows. For Rel-15, all the TPMI that does not apply to all ports cannot support full power transmission, since the maximum transmit power is scaled by non-zero ports/total number of ports. To address this issue, in Rel-16, full power transmission is supported conditionally for non-coherent/partial-coherent UE. Specifically, for UL full power transmission Mode 1 (i.e., ULFPTxModes=Mode1), a new TPMI was added to a new CodebookSubset with existing SRS configuration. For UL transmission Mode 2 (i.e., ULFPTxModes=Mode2), there is an existing CodebookSubset (see e.g., 3GPP TS 38.331), but SRS resource set is allowed to have SRS resource with different number of ports and UE is configured to indicate TPMIs that support full power UL Tx.

Figures 3A, 3B:
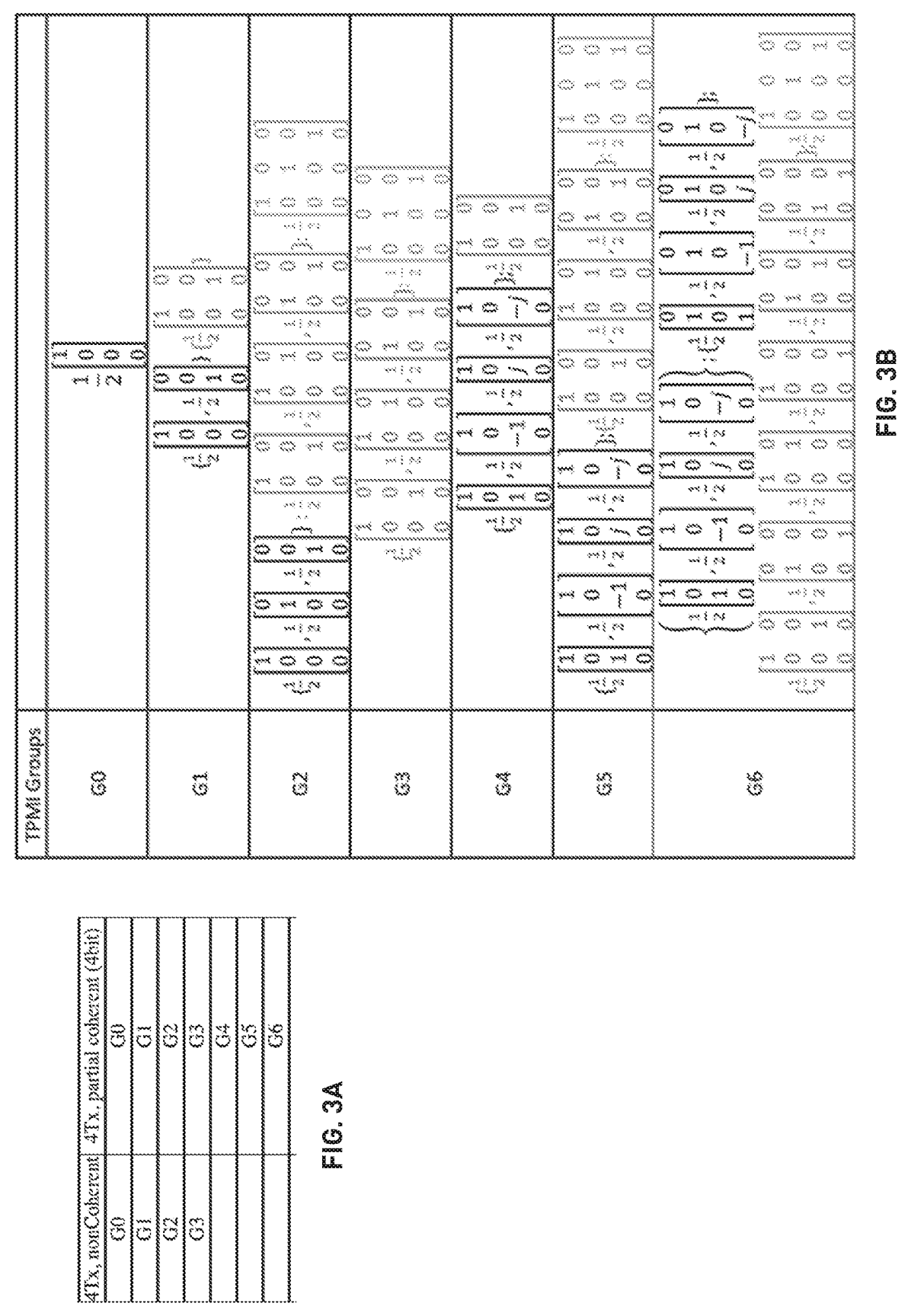

For instance, FIG. 3A and FIG. 3B show the Mode 2 approach for four ports in terms of indicating which TPMI supports full power. A UE is allowed to indicate a TPMI group per band combination. The so-called group choice is limited as follows. For two ports: two bits (i.e., a bit map) are used to indicate TPMI(s) which can deliver UL full power. For four ports, two bits are used for non-coherent; four bits are used for partial-coherent.

TPMI Capability Reporting

In the capability reporting information, the UE reports that it supports four-port full-coherent operation in a first embodiment. The UE also indicates that it supports full power transmission mode 2. Then, in the same capability reporting, the UE simultaneously reports all the viable TPMI capabilities for other possible RAN (e.g., gNB) configurations for the UE, since at the time of the capability reporting, the UE does not know what the gNB configuration will be. Because the gNB can establish a downgrade configuration for the UE in the first embodiment, the UE reports the following three possible gNB configurations that the UE can support. Specifically, the UE reports (a) a four-port partial-coherent TPMI list index (e.g., a TPMI group choice in G0-G6) to accommodate the possible situation in which the gNB configures the UE as partial/full-coherent four-port codebook-based PUSCH, (b) a four-port non-coherent TPMI list index (e.g., a TPMI group choice in G0-G3) to accommodate the possible situation in which the gNB configures the UE as non-coherent four-port codebook-based PUSCH, and (c) a two-port non-coherent (two-bit) bitmap to accommodate the possible situation in which the gNB configures UE as non-coherent/coherent two-port codebook-based PUSCH.

If UE does not report, then a fall back can be used, e.g., by taking non-coherent TPMIs from the reported partial-coherent TPMI list. For instance, the non-coherent TPMI within the TPMI list reported for four-port partial coherent operations (i.e. G0-G6) may be used. In another embodiment, when it is configured by gNB to operate in four-port non-coherent operation, the UE reports the four-port non-coherent TPMI list (i.e., G0-G3).

In a second embodiment, when the UE reports it supports a four-port partial-coherent operation, the UE simultaneously reports the following items: (a) a four-port partial-coherent TPMI list index is reported for when the UE is configured as partial-coherent four-port codebook-based PUSCH, (b) a two-port non-coherent bitmap is reported for when the UE is configured as non-coherent/coherent two-port codebook-based PUSCH, and (c) a four-port non-coherent TPMI list index is reported for when the UE is configured as non-coherent four-port codebook-based PUSCH. If UE does not report, a fall back can be used, i.e., by taking non-coherent TPMIs from the reported partial-coherent TPMI list.

In a third embodiment, when UE reports it supports a four-port non-coherent operation, the UE simultaneously reports the following items: (a) a four-port non-coherent TPMI list index is reported for when the UE is configured as non-coherent four-port codebook-based PUSCH, and (b) a two-port non-coherent bitmap is reported for when the UE is configured as non-coherent two-port codebook-based PUSCH.

In a fourth embodiment, when UE reports it supports a two-port operation (either coherent or non-coherent), the UE simultaneously reports a two-port non-coherent bitmap for when the UE is configured as non-coherent/coherent two-port codebook-based PUSCH.

In a fifth embodiment, when a UE reports that it supports full power transmission mode 2, the UE can indicate that UE only supports SRS enhancement, without support of any additional full power TPMI. Accordingly, the following options are available. In a first example, the UE reports a reserved value, such as "null" as one of the codepoints. For instance, for two-port TPMI, a bitmap (0, 0) can be used. For four-port partial coherent TPMI list, a reserved value (among 0-15) can be used. In a second example, the UE does not report the corresponding TPMI list/bitmap. In a third example, a three-bit bitmap design is provided (e.g., for two-port, four-port non-coherent, and four-port partial-coherent).

TPMI List Enhancement for Four-Port Partial Coherent UE

FIG. 4A is an annotated version of FIG. 3A, showing issues in the current TPMI list design shown and described previously with reference to FIG. 3B. The third column of the table in FIG. 4A shows that some power amplifier (PA) architecture are only supported for non-coherent, some PA architecture are only supported for partial coherent. Specifically, [23, 17, 23, 17] and [23, 23, 23, 17] are only for non-coherent systems. Likewise, [20, 17, 20, 17] and [20, 20, 20, 20] are only for partial-coherent systems.

FIG. 4B shows the TPMI that supports full power transmission for PA architecture [23, 17, 23, 17] dBm, for four-port partial-coherent UE. The following embodiments are provided as examples to introduce this support. A first embodiment entails changing the G1 definition to include the TPMI list of FIG. 4B. A second embodiment entails adding a new group to include the TPMI list of FIG. 4B. The new group is equivalent to G1+G4. A third embodiment entails the UE indicating that it supports more than one TPMI group. For example, up to two TPMI groups may be supported with certain restrictions.

FIG. 4C shows the TPMI that supports full power transmission for PA architecture [23, 23, 23, 17] dBm, for four-port partial-coherent UE. The following embodiments are provided as examples to introduce this support. A first embodiment entails changing the G2 definition to include the TPMI list of FIG. 4C. A second embodiment entails adding a new group to include the TPMI list of FIG. 4C. The new group is equivalent to G2+G4 or G2+G5. A third embodiment entails the UE indicating that it supports more than one TPMI group. For example, up to two TPMI groups may be supported with certain restrictions.

TPMI List Enhancement for Four-Port Non-Coherent UE

Figure 5A:
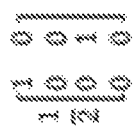
FIG. 5A illustrates a precoding matrix in accordance with one embodiment.

FIG. 5A shows the TPMI that supports full power transmission for PA architecture [20, 17, 20, 17] dBm, for four-port non-coherent UE. The following embodiments are provided as examples to introduce this support. A first embodiment entails adding a new group to include the TPMI list of FIG. 5A. The new group is equivalent to G4 with only non-coherent TPMI. A second embodiment entails the UE indicating that it supports G4. Only non-coherent TPMI is taken from G4.

Figure 5B:
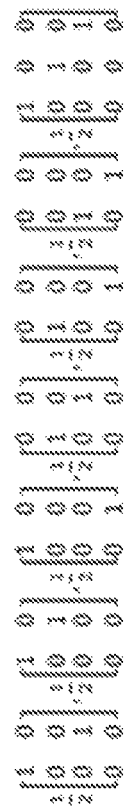
FIG. 5B illustrates a group of precoding matrices in accordance with one embodiment.

FIG. 5B shows the TPMI that supports full power transmission for PA architecture [20, 20, 20, 20] dBm, for four-port non-coherent UE. The following embodiments are provided as examples to introduce this support. A first embodiment entails adding a new group to include the TPMI list of FIG. 5B. The new group is equivalent to G6 with only non-coherent TPMI. A second embodiment entails the UE indicating that it supports G6. Only non-coherent TPMI is taken from G6.

Figure 6:
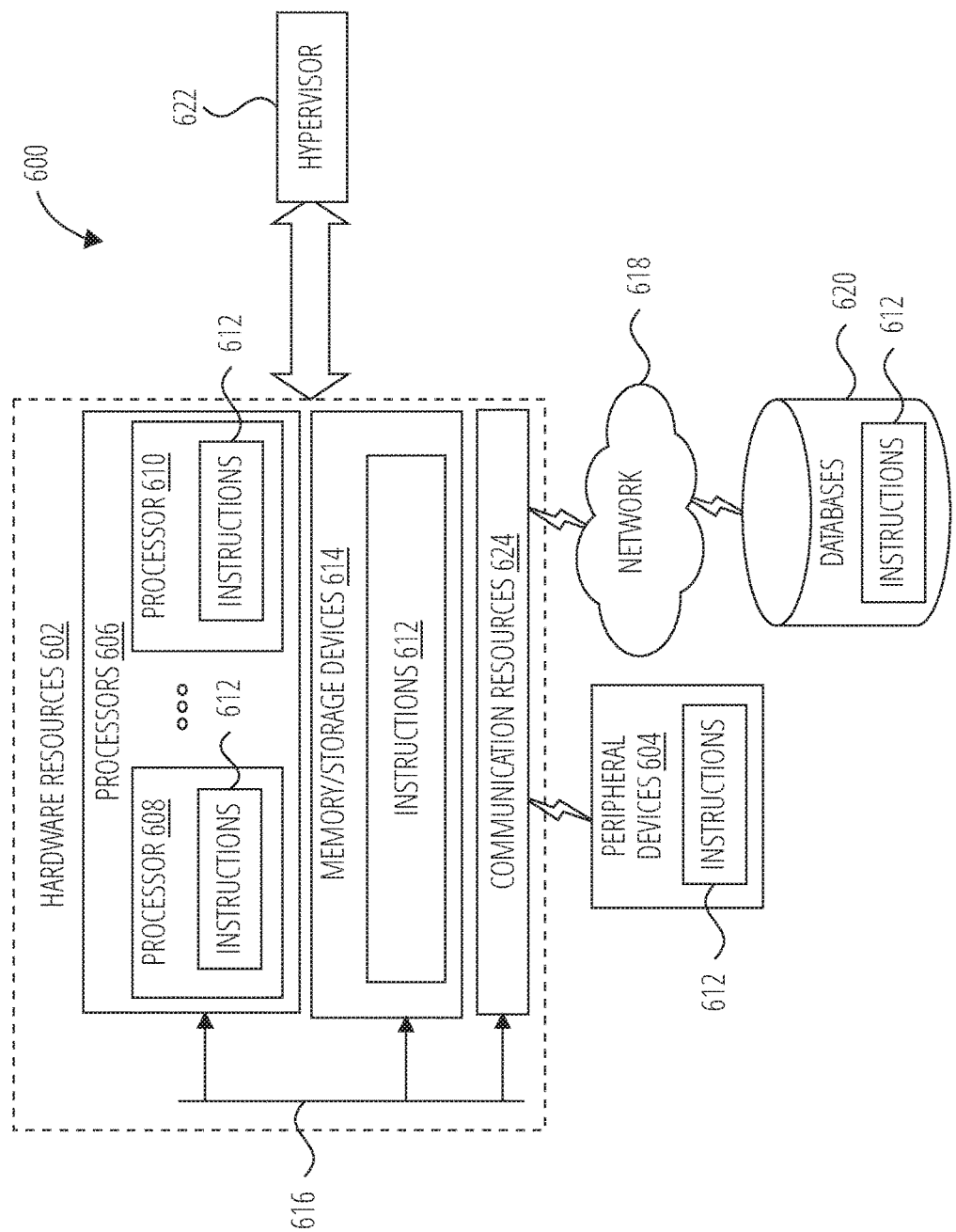
FIG. 6 illustrates components in accordance with one embodiment.

FIG. 6 is a block diagram illustrating components 600, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 602 including one or more processors 606 (or processor cores), one or more memory/storage devices 614, and one or more communication resources 624, each of which may be communicatively coupled via a bus 616. For embodiments where node virtualization (e.g., NFV) is utilized, a hypervisor 622 may be executed to provide an execution environment for one or more network slices/sub-slices to utilize the hardware resources 602.

The processors 606 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 608 and a processor 610.

The memory/storage devices 614 may include main memory, disk storage, or any suitable combination thereof. The memory/storage devices 614 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 624 may include interconnection or network interface components or other suitable devices to communicate with one or more peripheral devices 604 or one or more databases 620 via a network 618. For example, the communication resources 624 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 612 may comprise software, a program, an application, an applet, an app, or other executable code for causing at least any of the processors 606 to perform any one or more of the methodologies discussed herein. The instructions 612 may reside, completely or partially, within at least one of the processors 606 (e.g., within the processor's cache memory), the memory/storage devices 614, or any suitable combination thereof. Furthermore, any portion of the instructions 612 may be transferred to the hardware resources 602 from any combination of the peripheral devices 604 or the databases 620. Accordingly, the memory of the processors 606, the memory/storage devices 614, the peripheral devices 604, and the databases 620 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method, performed by a user equipment (UE), for facilitating full power transmission Mode 2 transmit precoding matrix indicator (TPMI) list signaling, the method comprising: generating a capability report indicating an intended TPMI configuration and a downgrade TPMI configuration of the UE, the intended TPMI configuration corresponding to a maximum port and desired coherency capability, the downgrade TPMI configuration corresponding to one or both of fewer ports and non-coherent capabilities; and transmitting to a radio access node the capability report.

Example 2 is the method of Example 1, in which the intended TPMI configuration corresponds to a four-port partial-coherent or full-coherent UE, and the downgrade TPMI configuration indicates a two-bit bitmap for supporting a two-port configuration, a four-port non-coherent TPMI list index, and a four-port partial-coherent TPMI list index.

Example 3 is the method of Example 1, in which the intended TPMI configuration corresponds to a four-port non-coherent UE, and the downgrade TPMI configuration indicates a two-bit bitmap for supporting a two-port configuration and four-port non-coherent TPMI list index.

Example 4 is the method of Example 1, in which the intended TPMI configuration corresponds to a two-port non-coherent or coherent UE, and the downgrade TPMI configuration indicates a two-bit bitmap for supporting a two-port configuration.

Example 5 is the method of Example 1 in which the capability report indicates the following precoding matrices for four-port partial coherent UE:

$$\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}.$$

Example 6 is the method of Example 1 in which the capability report indicates the following precoding matrices for four-port partial coherent UE:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix},$$

$$\frac{1}{2}\begin{bmatrix}1\\0\\-j\\0\end{bmatrix}, \frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}.$$

Example 7 is the method of Example 1 in which the capability report indicates the following precoding matrix for four-port non-coherent UE:

$$\frac{1}{2}\begin{bmatrix}1&0\\0&0\\0&1\\0&0\end{bmatrix}.$$

Example 8 is the method of Example 1 in which the capability report indicates the following precoding matrix for four-port non-coherent UE:

$$\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}.$$

Example 9 is the method of Example 1, further comprising including in the capability report a TPMI group choice selected from a group of eight or more choices including a choice representing a combination of two other choices.

Example 10 is the method of Example 1, further comprising including in the capability report a TPMI group choice selected from a group of eight or more choices including a choice representing a subset of TPMI from another choice.

Example 11 is the method of Example 1, further comprising including in the capability report multiple TPMI group choices.

Example 12 is a method, performed by a radio access node (RAN), for facilitating full power transmission in a mode 2 transmit precoding matrix indicator (TPMI) list signaling, the method comprising: processing a capability report from a user equipment (UE) to determine a codebook-based physical uplink shared channel (PUSCH) for the full power transmission, the capability report indicating an intended TPMI configuration and a downgrade TPMI configuration of the UE, the intended TPMI configuration corresponding to a maximum port and desired coherency capability, and the downgrade TPMI configuration corresponding to one or both of fewer ports and non-coherent capabilities; and transmitting to the UE downlink control information (DCI) including a TPMI indication configuring the UE for the full power transmission.

Example 13 is the method of Example 12, in which the intended TPMI configuration corresponds to a four-port partial-coherent or full-coherent UE, and the downgrade TPMI configuration indicates a two-bit bitmap for supporting a two-port configuration, a four-port non-coherent TPMI list index, and a four-port partial-coherent TPMI list index.

Example 14 is the method of Example 12, in which the intended TPMI configuration corresponds to a four-port non-coherent UE, and the downgrade TPMI configuration indicates a two-bit bitmap for supporting a two-port configuration and four-port non-coherent TPMI list index.

Example 15 is the method of Example 12, in which the intended TPMI configuration corresponds to a two-port non-coherent or coherent UE, and the downgrade TPMI configuration indicates a two-bit bitmap for supporting a two-port configuration.

Example 16 is the method of Example 12 in which the downgrade TPMI configuration is based on a TPMI group choice excluding any partial-coherent TPMIs.

Example 17 is the method of Example 12, in which the TPMI indication represents the following precoding matrices for four-port partial coherent UE:

$$\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}.$$

Example 18 is the method of Example 12, in which the TPMI indication represents the following precoding matrices for four-port partial coherent UE:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix},$$

$$\frac{1}{2}\begin{bmatrix}1\\0\\-j\\0\end{bmatrix}, \frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}.$$

Example 19 is the method of Example 12, in which the TPMI indication represents the following precoding matrix for four-port non-coherent UE:

$$\frac{1}{2}\begin{bmatrix}1 & 0\\0 & 0\\0 & 1\\0 & 0\end{bmatrix}.$$

Example 20 is the method of Example 12, in which the TPMI indication represents the following precoding matrices for four-port non-coherent UE:

$$\frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix}, \frac{1}{2}\begin{bmatrix}0 & 0\\1 & 0\\0 & 0\\0 & 1\end{bmatrix}, \frac{1}{2}\begin{bmatrix}0 & 0\\0 & 0\\1 & 0\\0 & 1\end{bmatrix}, \frac{1}{2}\begin{bmatrix}1 & 0 & 0\\0 & 1 & 0\\0 & 0 & 1\\0 & 0 & 0\end{bmatrix}.$$

Example 21 is a non-transitory computer-readable storage medium of a user equipment (UE), the computer-readable storage medium including instructions for facilitating full power transmission Mode 2 transmit precoding matrix indicator (TPMI) list signaling, the instructions that when executed by a computer, cause the computer to: generate a capability report indicating an intended TPMI configuration and a downgrade TPMI configuration of the UE, the intended TPMI configuration corresponding to a maximum port and desired coherency capability, the downgrade TPMI configuration corresponding to one or both of fewer ports and non-coherent capabilities; and transmit to a radio access node the capability report.

Example 22 is the computer-readable storage medium of Example 21, in which the intended TPMI configuration corresponds to a four-port partial-coherent or full-coherent UE, and the downgrade TPMI configuration indicates a two-bit bitmap for supporting a two-port configuration, a four-port non-coherent TPMI list index, and a four-port partial-coherent TPMI list index.

Example 23 is the computer-readable storage medium of Example 21, in which the intended TPMI configuration corresponds to a four-port non-coherent UE, and the downgrade TPMI configuration indicates a two-bit bitmap for supporting a two-port configuration and four-port non-coherent TPMI list index.

Example 24 is the computer-readable storage medium of Example 21, in which the intended TPMI configuration corresponds to a two-port non-coherent or coherent UE, and the downgrade TPMI configuration indicates a two-bit bitmap for supporting a two-port configuration.

Example 25 is the computer-readable storage medium of Example 21 in which the capability report indicates the following precoding matrices for four-port partial coherent $$\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1 & 0\\0 & 0\\0 & 1\\0 & 0\end{bmatrix}.$$

Example 26 is the computer-readable storage medium of Example 21 in which the capability report indicates the following precoding matrices for four-port partial coherent UE:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\j\\0\end{bmatrix},$$

$$\frac{1}{2}\begin{bmatrix}1\\0\\-j\\0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 1\\0 & 0\end{bmatrix}, \frac{1}{2}\begin{bmatrix}1 & 0 & 0\\0 & 1 & 0\\0 & 0 & 1\\0 & 0 & 0\end{bmatrix}.$$

Example 27 is the computer-readable storage medium of Example 21 in which the capability report indicates the following precoding matrix for four-port non-coherent UE:

$$\frac{1}{2}\begin{bmatrix}1 & 0\\0 & 0\\0 & 1\\0 & 0\end{bmatrix}.$$

Example 28 is the computer-readable storage medium of Example 21 in which the capability report indicates the following precoding matrix for four-port non-coherent UE:

$$\frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix}, \frac{1}{2}\begin{bmatrix}0 & 0\\1 & 0\\0 & 0\\0 & 1\end{bmatrix}, \frac{1}{2}\begin{bmatrix}0 & 0\\0 & 0\\1 & 0\\0 & 1\end{bmatrix}, \frac{1}{2}\begin{bmatrix}1 & 0 & 0\\0 & 1 & 0\\0 & 0 & 1\\0 & 0 & 0\end{bmatrix}.$$

Example 29 is the computer-readable storage medium of Example 21, wherein the instructions further configure the computer to include in the capability report a TPMI group choice selected from a group of eight or more choices including a choice representing a combination of two other choices.

Example 30 is the computer-readable storage medium of Example 21, wherein the instructions further configure the computer to include in the capability report a TPMI group choice selected from a group of eight or more choices including a choice representing a subset of TPMI from another choice.

Example 31 is the computer-readable storage medium of Example 21, wherein the instructions further configure the computer to include in the capability report multiple TPMI group choices.

Example 32 is a non-transitory computer-readable storage medium of a radio access node (RAN), the computer-readable storage medium including instructions for facilitating full power transmission in a mode 2 transmit precoding matrix indicator (TPMI) list signaling, the instructions, when executed by a computer, cause the computer to: process a capability report from a user equipment (UE) to determine a codebook-based physical uplink shared channel (PUSCH) for the full power transmission, the capability report indicating an intended TPMI configuration and a downgrade TPMI configuration of the UE, the intended TPMI configuration corresponding to a maximum port and desired coherency capability, and the downgrade TPMI configuration corresponding to one or both of fewer ports and non-coherent capabilities; and transmit to the UE downlink control information (DCI) including a TPMI indication configuring the UE for the full power transmission.

Example 33 is the computer-readable storage medium of Example 32, in which the intended TPMI configuration corresponds to a four-port partial-coherent or full-coherent UE, and the downgrade TPMI configuration indicates a two-bit bitmap for supporting a two-port configuration, a four-port non-coherent TPMI list index, and a four-port partial-coherent TPMI list index.

Example 34 is the computer-readable storage medium of Example 32, in which the intended TPMI configuration corresponds to a four-port non-coherent UE, and the downgrade TPMI configuration indicates a two-bit bitmap for supporting a two-port configuration and four-port non-coherent TPMI list index.

Example 35 is the computer-readable storage medium of Example 32, in which the intended TPMI configuration corresponds to a two-port non-coherent or coherent UE, and the downgrade TPMI configuration indicates a two-bit bitmap for supporting a two-port configuration.

Example 36 is the computer-readable storage medium of Example 32 in which the downgrade TPMI configuration is based on a TPMI group choice exclude any partial-coherent TPMIs.

Example 37 is the computer-readable storage medium of Example 32, in which the TPMI indication represents the following precoding matrices for four-port partial coherent UE:

$$\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1 & 0\\0 & 0\\0 & 1\\0 & 0\end{bmatrix}.$$

Example 38 is the computer-readable storage medium of Example 32, in which the TPMI indication represents the following precoding matrices for four-port partial coherent UE:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix},$$

$$\frac{1}{2}\begin{bmatrix}1\\0\\-j\\0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 1\\0 & 0\end{bmatrix}, \frac{1}{2}\begin{bmatrix}1 & 0\\0 & 1\\0 & 0\\0 & 0\end{bmatrix}.$$

Example 39 is the computer-readable storage medium of Example 32, in which the TPMI indication represents the following precoding matrix for four-port non-coherent UE:

$$\frac{1}{2}\begin{bmatrix}1 & 0\\0 & 0\\0 & 1\\0 & 0\end{bmatrix}.$$

Example 40 is the computer-readable storage medium of Example 32, in which the TPMI indication represents the following precoding matrices for four-port non-coherent UE:

$$\frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix},$$

$$\frac{1}{2}\begin{bmatrix}0 & 0\\1 & 0\\0 & 0\\0 & 1\end{bmatrix}, \frac{1}{2}\begin{bmatrix}0 & 0\\0 & 0\\1 & 0\\0 & 1\end{bmatrix}, \frac{1}{2}\begin{bmatrix}1 & 0 & 0\\0 & 1 & 0\\0 & 0 & 1\\0 & 0 & 0\end{bmatrix}; \text{ and}$$

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment. PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a user equipment (UE), for facilitating full power transmission Mode 2 transmit precoding matrix indicator (TPMI) list signaling, the method comprising:
generating one capability report indicating both an intended TPMI configuration and a downgrade TPMI configuration of the UE in the same capability report, the intended TPMI configuration corresponding to a maximum port and desired coherency capability, the downgrade TPMI configuration corresponding to fewer ports and non-coherent capabilities,
wherein the intended TPMI configuration indicates support for four-port full-coherent operation;
wherein the downgrade TPMI configuration includes:
a two-bit bitmap for supporting a two-port configuration,
a four-port non-coherent TPMI list index, and
a four-port partial-coherent TPMI list index, wherein a fall back non-coherent TPMI list is based on the four-port partial-coherent TPMI list index, wherein the fall back non-coherent TPMI list comprises non-coherent TPMIs corresponding to the four-port partial-coherent TPMI list index, and
wherein the capability report indicates the following precoding matrices for four-port partial coherent UE, and wherein the precoding matrices supports a power amplifier (PA) architecture [23, 17, 23, 17] dBm:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1 & 0\\0 & 0\\0 & 1\\0 & 0\end{bmatrix}$$

transmitting to a radio access node the capability report to simultaneously report the intended TPMI configuration and the downgrade TPMI configuration of the UE the in a same capability reporting transmission.

2. The method of claim 1 in which the capability report indicates the following precoding matrices for four-port partial coherent UE:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix},$$

$$\frac{1}{2}\begin{bmatrix}1\\0\\-j\\0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 1\\0 & 0\end{bmatrix}, \frac{1}{2}\begin{bmatrix}1 & 0 & 0\\0 & 1 & 0\\0 & 0 & 1\\0 & 0 & 0\end{bmatrix}.$$

3. The method of claim 1 in which the capability report indicates the following precoding matrix for four-port non-coherent UE:

$$\frac{1}{2}\begin{bmatrix}1 & 0\\0 & 0\\0 & 1\\0 & 0\end{bmatrix}.$$

4. The method of claim 1 in which the capability report indicates the following precoding matrix for four-port non-coherent UE:

$$\frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix}, \frac{1}{2}\begin{bmatrix}0 & 0\\1 & 0\\0 & 0\\0 & 1\end{bmatrix}, \frac{1}{2}\begin{bmatrix}0 & 0\\0 & 0\\1 & 0\\0 & 1\end{bmatrix}, \frac{1}{2}\begin{bmatrix}1 & 0 & 0\\0 & 1 & 0\\0 & 0 & 1\\0 & 0 & 0\end{bmatrix}.$$

5. The method of claim 1, further comprising including in the capability report a TPMI group choice selected from a group of eight or more choices including a choice representing a combination of two other choices.

6. The method of claim 1, further comprising including in the capability report a TPMI group choice selected from a group of eight or more choices including a choice representing a subset of TPMI from another choice.

7. The method of claim 1, further comprising including in the capability report multiple TPMI group choices.

8. A method, performed by a radio access node (RAN), for facilitating full power transmission in a mode 2 transmit precoding matrix indicator (TPMI) list signaling, the method comprising:

processing one capability report from a user equipment (UE) to determine a codebook-based physical uplink shared channel (PUSCH) for the full power transmission, the capability report indicating both an intended TPMI configuration and a downgrade TPMI configuration of the UE, the intended TPMI configuration corresponding to a maximum port and desired coherency capability, and the downgrade TPMI configuration corresponding to fewer ports and non-coherent capabilities, wherein the capability report simultaneously reports the intended TPMI configuration and the downgrade TPMI configuration in a same capability reporting transmission, wherein the intended TPMI configuration indicates support for four-port full-coherent operation;

wherein the downgrade TPMI configuration includes:
- a two-bit bitmap for supporting a two-port configuration,
- a four-port non-coherent TPMI list index, and
- a four-port partial-coherent TPMI list index, wherein a fall back non-coherent TPMI list is based on the four-port partial-coherent TPMI list index, wherein the fall back non-coherent TPMI list comprises non-coherent TPMIs corresponding to the four-port partial-coherent TPMI list index, and wherein the capability report indicates the following precoding matrices for four-port partial coherent UE, and wherein the precoding matrices supports a power amplifier (PA) architecture [23, 17, 23, 17] dBm:

$$\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1 & 0\\0 & 0\\0 & 1\\0 & 0\end{bmatrix}; \text{and}$$

transmitting to the UE downlink control information (DCI) including a TPMI indication configuring the UE for the full power transmission.

9. The method of claim 8 in which the downgrade TPMI configuration is based on a TPMI group choice excluding any partial-coherent TPMIs.

10. The method of claim 8, in which the TPMI indication represents the following precoding matrices for four-port partial coherent UE:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix},$$

$$\frac{1}{2}\begin{bmatrix}1\\0\\-j\\0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 1\\0 & 0\end{bmatrix}, \frac{1}{2}\begin{bmatrix}1 & 0\\0 & 1\\0 & 0\\0 & 0\end{bmatrix}.$$

11. The method of claim 8, in which the TPMI indication represents the following precoding matrix for four-port non-coherent UE:

$$\frac{1}{2}\begin{bmatrix}1 & 0\\0 & 0\\0 & 1\\0 & 0\end{bmatrix}.$$

12. The method of claim 8, in which the TPMI indication represents the following precoding matrices for four-port non-coherent UE:

$$\frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix}, \frac{1}{2}\begin{bmatrix}0 & 0\\1 & 0\\0 & 0\\0 & 1\end{bmatrix}, \frac{1}{2}\begin{bmatrix}0 & 0\\0 & 0\\1 & 0\\0 & 1\end{bmatrix}, \frac{1}{2}\begin{bmatrix}1 & 0 & 0\\0 & 1 & 0\\0 & 0 & 1\\0 & 0 & 0\end{bmatrix}.$$

13. A user equipment (UE) apparatus comprising:
a processor; and
a memory storing instructions that, when executed by the processor, configure the apparatus to:

generate one capability report indicating both an intended TPMI configuration and a downgrade TPMI configuration of the UE in the same capability report, the intended TPMI configuration corresponding to a maximum port and desired coherency capability, the downgrade TPMI configuration corresponding to fewer ports and non-coherent capabilities, wherein the intended TPMI configuration indicates support for four-port full-coherent operation;

wherein the downgrade TPMI configuration includes:
a two-bit bitmap for supporting a two-port configuration,
a four-port non-coherent TPMI list index, and
a four-port partial-coherent TPMI list index, wherein a fall back non-coherent TPMI list is based on the four-port partial-coherent TPMI list index, wherein the fall back non-coherent TPMI list comprises non-coherent TPMIs corresponding to the four-port partial-coherent TPMI list index, and wherein the capability report indicates the following precoding matrices for four-port partial coherent UE, and wherein the precoding matrices supports a power amplifier (PA) architecture [23, 17, 23, 17] dBm:

$$\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1 & 0\\0 & 0\\0 & 1\\0 & 0\end{bmatrix}; \text{and}$$

transmit to a radio access node the capability report to simultaneously report the intended TPMI configuration and the downgrade TPMI configuration of the UE the in a same capability reporting transmission.

14. The UE apparatus of claim 13, in which the capability report indicates the following precoding matrices for four-port partial coherent UE:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix},$$

-continued $$\frac{1}{2}\begin{bmatrix}1\\0\\-j\\0\end{bmatrix}, \frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}.$$

15. The UE apparatus of claim 13, in which the capability report indicates the following precoding matrix for four-port non-coherent UE:

$$\frac{1}{2}\begin{bmatrix}1&0\\0&0\\0&1\\0&0\end{bmatrix}.$$

16. The UE apparatus of claim 13, in which the capability report indicates the following precoding matrix for four-port non-coherent UE:

$$\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}.$$

17. The UE apparatus of claim 13, wherein the capability report includes a TPMI group choice selected from a group of eight or more choices including a choice representing a combination of two other choices.

18. The UE apparatus of claim 13, wherein the capability report includes a TPMI group choice selected from a group of eight or more choices including a choice representing a subset of TPMI from another choice.

19. The UE apparatus of claim 13, wherein the capability report includes multiple TPMI group choices.

* * * * *